(12) United States Patent
Jarman et al.

(10) Patent No.: US 9,392,245 B2
(45) Date of Patent: *Jul. 12, 2016

(54) MEDIA PLAYER CONFIGURED TO RECEIVE PLAYBACK FILTERS FROM ALTERNATIVE STORAGE MEDIUMS

(75) Inventors: Matthew T. Jarman, Salt Lake City, UT (US); Brent L. Iverson, Lehi, UT (US)

(73) Assignee: Clearplay, Inc., Salt Lake City, UT (US)

( * ) Notice: Subject to any disclaimer, the term of this patent is extended or adjusted under 35 U.S.C. 154(b) by 954 days.

This patent is subject to a terminal disclaimer.

(21) Appl. No.: 13/396,379

(22) Filed: Feb. 14, 2012

(65) Prior Publication Data

US 2012/0207446 A1 Aug. 16, 2012

Related U.S. Application Data

(63) Continuation of application No. 11/327,103, filed on Jan. 5, 2006, now Pat. No. 8,117,282, which is a continuation-in-part of application No. 11/256,419, filed on Oct. 20, 2005, now Pat. No. 7,975,021.

(60) Provisional application No. 60/641,678, filed on Jan. 5, 2005, provisional application No. 60/620,902, filed on Oct. 20, 2004.

(51) Int. Cl.
| | |
|---|---|
| *G06F 15/16* | (2006.01) |
| *H04N 9/804* | (2006.01) |
| *H04L 29/06* | (2006.01) |
| *H04L 12/28* | (2006.01) |
| *H04N 5/781* | (2006.01) |
| *H04N 5/85* | (2006.01) |
| *H04N 5/907* | (2006.01) |

(52) U.S. Cl.
CPC .......... *H04N 9/8042* (2013.01); *H04L 65/4084* (2013.01); *H04L 2012/2849* (2013.01); *H04N 5/781* (2013.01); *H04N 5/85* (2013.01); *H04N 5/907* (2013.01)

(58) Field of Classification Search
CPC ... H04L 65/60; H04L 65/607; H04L 65/4084; H04L 2012/2849; H04N 21/2662; H04N 21/4627; H04N 21/4542; H04N 9/8042; H04N 5/781; H04N 5/85; H04N 5/907
USPC ............... 709/219, 217, 231; 725/25, 46; 386/125, 224, 239
See application file for complete search history.

(56) References Cited

U.S. PATENT DOCUMENTS

| | | | | |
|---|---|---|---|---|
| 6,289,165 | B1 * | 9/2001 | Abecassis | 386/224 |
| 8,117,282 | B2 * | 2/2012 | Jarman et al. | 709/219 |
| 2003/0192044 | A1 * | 10/2003 | Huntsman | 725/25 |

(Continued)

*Primary Examiner* — Jungwon Chang
(74) *Attorney, Agent, or Firm* — Polsinelli PC

(57) ABSTRACT

A media player configured with a first removable memory reader, such as a DVD drive, and a second removable memory reader, such as a flash memory reader, adapted to communicate with a removable memory containing filter data. The media player is configured to allow filtered playback of a multimedia presentation, such as a movie. Filtered playback causes certain portions of the multimedia presentation to be skipped, muted, blurred, cropped, or otherwise modified to eliminate or reduce potentially objectionable scenes, language, or other content. The second memory reader provides a convenient medium for the loading of filter information, whether data files, executable program code, or the like, to local memory of the media player to employ during filtered playback. Alternatively, the filters may be accessed from the removable storage media during playback rather than loading to local memory.

25 Claims, 7 Drawing Sheets

(56) References Cited

U.S. PATENT DOCUMENTS

| | | | |
|---|---|---|---|
| 2004/0096200 A1* | 5/2004 | Chen et al. | 386/125 |
| 2005/0010952 A1* | 1/2005 | Gleissner et al. | 725/46 |
| 2005/0097595 A1* | 5/2005 | Lipsanen et al. | 725/25 |

* cited by examiner

MOVIE/FILTER DETAILS SCREEN

MOVIE LIST: MOVIE RELEASE DETAILS

| MOVIE TITLE 1 ☑ | [MOVIE TITLE 1 (LINE 1)] |
|---|---|
| MOVIE TITLE 2 ☐ | [MOVIE TITLE 1 (LINE 2)] |
| MOVIE TITLE 3 ☐ | [#] OF [#] DVD RELEASES |
| MOVIE TITLE 4 ☑ | [RELEASE DESCRIPTION] |
| MOVIE TITLE 5 ☐ | [ASPECT RATIO] |
| MOVIE TITLE 6 ☐ | LANGUAGE: [LANGUAGE] |
| MOVIE TITLE 7 ☑ | FILTER: [DATE] |
| MOVIE TITLE 8 ☑ | CATALOG NUMBER: [#####] |

PRESS OK TO SELECT A MOVIE FILTER.
PRESS > FOR MORE INFORMATION. EJECT THE
DISC WHEN DONE SELECTING FILTERS.

50    48

| 1. | [OK] | CHECK/UN-CHECK TITLE |
|---|---|---|
| 2. | [ARROW RIGHT] | DISPLAY NEXT DETAILS PAGE |
| 3. | [ARROW LEFT] | [NEW RELEASES] MOVE FOCUS TO [ALL MOVIES] MOVE FOCUS TO. |
| 4. | [ARROW UP] | MOVE FOCUS TO PREVIOUS TITLE. IF AT TOP OF LIST MOVE TO BOTTOM 'ROLL'. |
| 5. | [ARROW DOWN] | MOVE FOCUS TO NEXT TITLE. IF AT BOTTOM OF LIST MOVE TO TOP 'ROLL'. |
| 6. | [EJECT] | DISPLAY "PLEASE WAIT" SCREEN. UPDATE FLASH MEMORY WITH SELECTED FILTERS THEN EJECT DISC. |

FIG.8

MEDIA PLAYER CONFIGURED TO RECEIVE PLAYBACK FILTERS FROM ALTERNATIVE STORAGE MEDIUMS

CROSS-REFERENCE TO RELATED APPLICATIONS

The present application claims priority and is a continuation of non-provisional application Ser. No. 11/327,103 titled "Media Player Configured to Receive Playback Filters from Alternative Storage Mediums" filed Jan. 5, 2006 which claims priority to provisional application No. 60/641,678 titled "Video Player Configured to Receive Playback Filters from Alternative Storage Mediums" filed Jan. 5, 2005 and, which are hereby incorporated by reference herein.

Application Ser. No. 11/327,103 also claims priority to and is a continuation-in-part of U.S. non-provisional application Ser. No. 11/256,419 titled "Method and User Interface to Downloading Audio and Video Content Filters to a Media Player" filed on Oct. 20, 2005, which claims priority to provisional application No. 60/620,902 titled "Method and User Interface for Downloading Audio and Video Content Filters to a Media Player" filed on Oct. 20, 2004 (the '902 application), which are hereby incorporated by reference herein.

FIELD OF INVENTION

The present invention generally relates to the field of modifying playback of a multimedia presentation, such as video, from a storage medium, and more particularly to a medial player, such as a DVD player, configured to upload playback filters to a local memory or otherwise use playback filters from either a removable storage medium in communication with a video memory inference, such as a DVD drive, or a removable memory interface, such as a flash memory interface, USB memory interface, memory stick interface, or the like, and apply the filters to, modify, e.g., skip or mute certain portions of video during playback.

BACKGROUND

A multimedia presentation, such as audio provided on CD and a movie provided on DVD, may contain certain language, images, scenes, or other content, not suitable or considered objectionable by certain audiences. To address this concern, certain technologies have been developed to allow filtering, such as skipping or muting, various types of content. This technology allows, for example, the viewing of a movie originally containing more adult-oriented content by younger, less mature viewers. Generally, the filtering function is provided by a media content "filter" resident within the DVD player that specifically applies to a particular multimedia presentation. The filter, which is typically stored within a nonvolatile logic memory of the media player, such as flash memory, indicates which portions of the multimedia presentation are to be skipped, or which audio portions are to be muted, by the DVD player during playback. Typically, whether the filter is employed for a particular presentation of the multimedia may be determined by the user by way of a menu selection system provided by the media player. Further, different forms of objectionable content, such as profane language, sexually explicit content, and so on, may also be selectively filtered by way of the menu system. In some systems, the filtering system may be protected by way of a user-defined password so that those not privy to the password are unable to defeat the filtering mechanism.

Each filter specific to a particular presentation is typically produced at some point after a multimedia presentation has been released. Thus, for example, while some filters for pre-existing movies may be pre-installed in the DVD player, the player normally also includes a method of accepting and storing new filters as they are produced. Typically, filters are installed by way of a CD, DVD, or other disc readable by the same memory reader of the DVD player that also reads the DVD or other storage medium having the multimedia presentation. Therefore, a user inserts the disc containing the filters of interest into the tray or slot normally employed for playback. The DVD player, recognizing the disc as one containing filters, installs the filters from the disc, possibly at the guidance of the user by way of the player menu system.

SUMMARY

One aspect of the invention involves a method for loading filter information to a media player. The method involves analyzing a status of a first memory reader adapted to communicate with a removable storage medium including data associated with a multimedia presentation. The method further involves establishing communication with a second storage medium and determining whether the second storage medium includes filtering information associated with a multimedia presentation. Then, filtered play of the presentation may occur.

Another aspect of the invention involves a media player including a processing configuration in communication with a first memory reader. The first memory reader configured to receive and read information from a first storage medium including data associated with a multimedia presentation, such as a DVD with encoded audio and video data (e.g., a movie). The media player further comprises a second memory reader, which also may be in communication with the processing configuration, the second memory reader configured to read filter information from a second storage medium.

BRIEF DESCRIPTION OF THE DRAWINGS

In order to describe the manner in which the above-recited and other advantages and features of implementations of the invention can be obtained, a more particular description of the implementations briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8 is a sixth menu related to selecting and loading filter information to a local memory of a media player or otherwise employing filter information from an alternative storage media.

DETAILED DESCRIPTION OF EMBODIMENTS OF THE INVENTION

Figure 1:
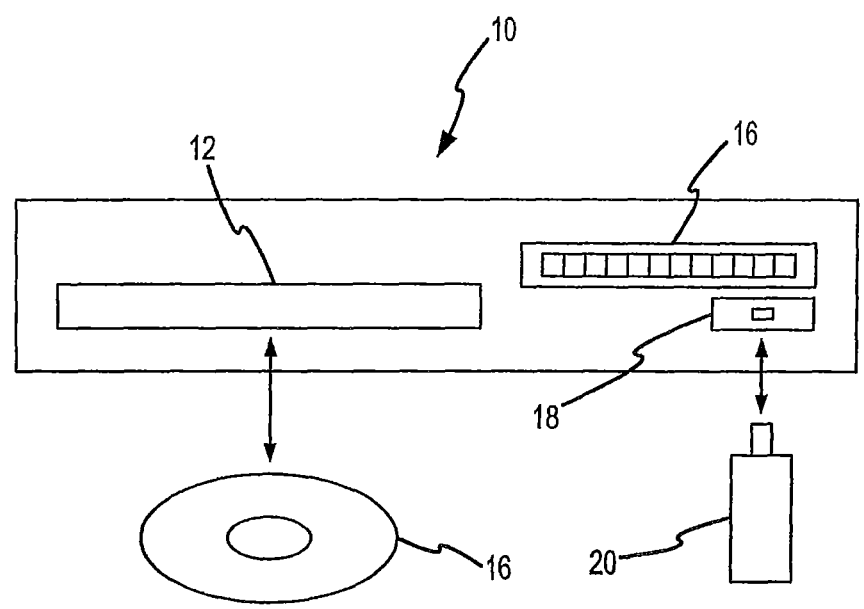
FIG. 1 is a block diagram of a media player including a first memory reader for receiving media information and a second memory reader for receiving filter information from a removable memory.

Aspects of the present invention involve methods, systems, apparatus, and computer program products for automatically identifying and filtering portions of multimedia content. In one implementation, a media player is configured with at least first and second memory readers, where one or both of the memory readers are configured to receive filter information, such as filter data, files, executable code, or combinations thereof, etc., from removable memory. Such a configuration provides added flexibility in loading filter information to the media player or otherwise accessing filtering information, and does not require the same memory reader be employed for both play of a multimedia presentation as well as filter access.

In one implementation, the filter information defines selectable filtering attributes for particular multimedia titles. The filter information may be uploaded from the removable memory to an internal memory of the media player or accessed directly by the media player from the removable memory. During display of the multimedia presentation, such as during play of a DVD, the player continually checks the filter information to determine if a particular portion of a movie should be filtered.

A broad aspect of the invention involves filtering one or more portions of a multimedia presentation. Filtering may involve muting objectionable language in a multimedia presentation, skipping past objectionable portions of a multimedia presentation, modifying the presentation of an image or images, which may be a stream of images as in a movie, such as through cropping, fading, blurring, or zooming some portion of the image, or otherwise modifying presentation of the multimedia presentation to eliminate, reduce, or modify the objectionable or unwanted language, images, or other content. Filtering may further extend to other content that may be provided in a multimedia presentation, including close captioning text, data links, program guide information, etc. One such filtering technology involves a media player, such as a personal computer or DVD player, configured to allow filtered playback of a movie or other multimedia presentation as described in U.S. patent application Ser. No. 11/104,924 titled "Apparatus, System, and Method for Filtering Objectionable Portions of Multimedia Presentation," filed on Apr. 12, 2005 (the '924 application), which is hereby incorporated by reference herein. Other filter technologies configured to allow filtered playback of a movie or other multimedia presentation are described in U.S. application Ser. No. 09/694,873 titled "Multimedia Content Navigation and Playback" filed on Oct. 23, 2000, now U.S. Pat. No. 6,898,799, which issued May 24, 2005, and U.S. application Ser. No. 09/695,102 titled "Delivery of Navigation Data for Playback of Audio and Video Content" filed on Oct. 23, 2000, now U.S. Pat. No. 6,889,383 which issued May 3, 2005, which are each incorporated by reference herein. In accordance with further aspects of the present invention, in one particular implementation, the media player is configured with the infrastructure to obtain filter information from more than one removable memory media.

By way of example, filtering technology is described herein with reference to the filtering technology set forth in the '924 application. However, various aspects of the present invention are not limited to application in a platform conforming to the '924 application. Rather, aspects of the present invention are applicable to any platform, media player or otherwise, that allows or facilitates filtering or otherwise modifying play of a movie or other form of multimedia presentation.

With respect particularly to DVD-based audiovisual presentations, such as audio and video, typically, some types of DVD can hold a full-length film with up to 133 minutes of high quality audio and video compressed or encoded, such as through a Moving Picture Experts Group ("MPEG") coding formats. One advantage of the particular filtering platform described in the '924 application, is that it does not require any modification or alteration of the formatting of the presentation in order for filtering to occur. Stated another way, to perform filtering, the presentation need not be preformatted and stored on the DVD with any particular separate information related to the language or type of images being delivered at any point in the presentation. Rather, filtering involves monitoring existing time codes of multimedia data read from the DVD or closely tracking the timing of the presentation. As described in greater detail below, a filter file or event includes a time code corresponding to a portion of the multimedia data that is intended to be skipped or muted. A match between a time code of a portion of the multimedia presentation read from a DVD with a time code in the filter file, causes the execution of a filtering action, such as a mute or a skip. It is also possible to monitor other indicia of the multimedia data read from the DVD, such as indicia of the physical location on a memory media from which the data was read.

Until the mute, time seek (skip) or other filtering action is executed, the DVD player reads the multimedia information from the DVD during conventional sequential play of the multimedia presentation. Thus, the operations associated with a play command on the DVD are executed. The play command causes the read-write head to sequentially read portions of the video from the DVD. As used herein, the term "sequential" is meant to refer to the order of data that corresponds to the order of a multimedia presentation. The multimedia data, however, may be physically located on a memory media in a non-sequential manner. Moreover, MPEG coding may involve non-linear access to certain types of data for proper decoding and display. Typically, the multimedia information read from the DVD is stored in a buffer. From the buffer, the MPEG coded multimedia information is decoded prior to display on a monitor, television, or the like. The buffer allows the system to maintain a fairly constant decoding rate so that the presentation of the movie is not negatively affected from processing, or retrieval, or other latencies. A buffer may not be necessary depending on the retrieval speed, decoding speed, and other factors.

In one aspect, the time code for the multimedia information read from a memory media and stored in a memory buffer is compared to filter files in a filter table. A filter table is a collection of one or more filter files, also referred to as a filter or event, for a particular multimedia presentation. A filter file is an identification of a portion of a multimedia presentation and a corresponding filtering action. Each filter file may be identified by or otherwise associated with one or more filter types, such as Strong Action Violence or Brutal/Gory violence filter types. The portion of the multimedia presentation may be identified by a start (or interrupt) and end time (or resume code), by start and end physical locations on a memory media, by a time or location and an offset value (time, distance, physical location, or a combination thereof, etc.). Within a filter table for a particular presentation, a user may activate any combination of filter files or no filter files. Further, as set forth in the U.S. provisional patent application titled "Apparatus, System and Method for Creation, Delivery and Utilization of Recommended Filter Settings," filed on the same day as this application under Ser. No. 60/756,905, which is hereby incorporated by reference herein, some combinations of filter types may be recommended, preselected, or preset. For example, for the film "Gladiator," the Strong Action Violence filter may be deactivated and the Brutal/Gory Violence filter activated. Thus, some or all portions of the movie associated with a Strong Action Violence filter type will be shown while some or all portions of the movie associated with a Brutal/Gory violence filter type will be skipped or otherwise filtered.

In some instances, a particular filter type may only be partially supported. For example, there may be ten instances in a movie associated with strong action violence. However, filtering (e.g. skipping) one of the instances may alter the movie in such a manner that some important aspect would no longer make sense. In such a situation, the one instance is shown despite actuation of the strong action violence filter. Typically, the user is provided with a warning of some sort.

Table 1 below provides two examples of filter files for the movie "Gladiator". The filter types set forth in Table 1 are similar, but not the same, as other examples of filter types set forth herein. As set forth in further detail below, a filter table for a particular multimedia presentation may be provided as a data file or other data arrangement, a set of instructions, or a combination thereof, on a removable memory media, in the same memory media as the multimedia presentation, or otherwise loaded into the memory of a multimedia player configured to operate in accordance with aspects of the invention.

TABLE 1

Filter Table with example of two Filter Files for the Film Gladiator

| Filter (Event) | Start (Interrupt) | End (Resume) | Duration | Filter Action | Filter Codes (Types) |
|---|---|---|---|---|---|
| 1 | 00:04:15:19 | 00:04:48:26 | 997 | Skip | 2: V-D-D, V-D-G |
| 2 | 00:04:51:26 | 00:04:58:26 | 210 | Skip | 1: V-D-G |

Referring to Table 1, the first filter file (1) has a start time of 00:04:15:19 (hour:minute:second:frame) and an end time of 00:04:48:26. The first filter file further has a duration of 997 frames and is a "skip" type filtering action (as opposed to mute or other filtering action). Finally, the first filter file is associated with two filter types. The first filter type is identified as "V-D-D", which is a filter code for a violent (V) scene in which a dead (D) or decomposed (D) body is shown. The second filter type is identified as "V-D-G", which is a filter code for a violent (V) scene associated with disturbing (D) and/or gruesome (G) imagery and/or dialogue. Implementations of the present invention may include numerous other filter types. During filtered playback of the film "Gladiator," if the "V-D-D", "V-D-G," or both filter files are activated, the 997 frames falling between 00:04:15:19 and 00:04:48:26 are skipped (not shown). Additionally, if the V-D-G filter file is activated, the 210 frames falling between 00:04:51:26 and 00:04:58:26 are skipped.

Table 2 below provides one example of various possible filter types conforming to one particular embodiment of the present invention. Other filter types, quantities of filter types, etc., may be implemented in various embodiments conforming to aspects of the present invention.

TABLE 2

Filter Types and Associated Description of Content of Scene for each Filter Type

| Filter Code | Filter Classification | Filter type | Filter Action |
|---|---|---|---|
| V-S-A | Violence | Strong Action Violence | Removes excessive violence, including fantasy violence |
| V-B-G | Violence | Brutal/Gory Violence | Removes brutal and graphic violence scenes |
| V-D-I | Violence | Disturbing Images | Removes gruesome and other disturbing images |
| S-S-C | Sex and Nudity | Sensual Content | Removes highly suggestive and provocative situations and dialogue |
| S-C-S | Sex and Nudity | Crude Sexual Content | Removes crude sexual language and gestures |
| S-N | Sex and Nudity | Nudity | Removes nudity, including partial and art nudity |
| S-E-S | Sex and Nudity | Explicit Sexual Situation | Removes explicit sexual dialogue, sound and actions |
| L-V-D | Language | Vain Reference to Deity | Removes vain or irreverent reference to Deity |
| L-C-L | Language | Crude Language and Humor | Removes crude sexual language and gestures |
| L-E-S | Language | Ethnic and Social Slurs | Removes ethnically or socially offensive results |
| L-C | Language | Cursing | Removes profane uses of "h*ll" and "d*mn" |
| L-S-P | Language | Strong Profanity | Removes swear words, including strong profanities |

TABLE 2-continued

Filter Types and Associated
Description of Content of Scene for each Filter Type

| Filter Code | Filter Classification | Filter type | Filter Action |
|---|---|---|---|
| L-G-V | Language | Graphic Vulgarity | Removes graphic vulgarities, including "f***" |
| O-E-D | Other | Explicit Drug Use | Removes descriptive scenes of illegal drug use |

Table 2 provides a list of examples of filter types that may be provided individually or in combination in an embodiment conforming to the invention. The filter types are grouped into four broad classifications, including: Violence, Sex/Nudity, Language, and Other. Within each of the four broad classifications, are a listing of particular filter types associated with each broad classification. In a filter table for a particular multimedia presentation, various time sequences (between a start time and an end time) of a multimedia presentation may be identified as containing subject matter falling within one or more of the filter types. In one particular implementation, multimedia time sequences may be filtered as a function of a particular filter type, e.g., V-S-A. Alternatively, or additionally, multimedia time sequences may be filtered as a function of a broad classification, e.g., V, in which case all portions of a multimedia presentation falling within a broad filter classification will be skipped or muted.

FIG. 1 is a diagram of a media player 10, such as a DVD player, configured with two removable memory interfaces, according to one aspect of the present invention. The media player may be a standalone unit with some form of output for driving a display of some sort, such as a monitor or television, or may be integrated within a monitor, television, etc. A media player includes conventional electronics, such as one or more processors and related circuitry, configured to play a movie stored on or in accordance with DIVX MPEG-4, XVID, DVD (DVD-ROM, DVD-R/RW, DVD-RAM, DVD+R/RW, DVD-R DL, DVD+R DL, single sided, double sided, layered, etc.), SVCD, VCD, CD-DA, CD-R, CD-RW, or other video storage/playback platforms. In one particular implementation, the media player includes a tray 12 or slot that is configured to receive a movie storage medium and position the storage medium 14 over the appropriate read interface, such as a laser positioned to read data from the DVD during playback. The media player also includes various control inputs 16, such as play, stop, pause, fast forward, rewind, and the like types of buttons, configured to provide an interface by which a user can operate the player. The media player may also be controlled through a remote control unit as well as on screen menus accessible and controllable through the remote control unit. Additionally, the media player includes a removable storage medium ("RSM") reader or interface 18. The RSM reader is adapted to receive a removable memory 20 or otherwise establish communication with a removable memory and read or otherwise access the information stored thereon. Examples of possible removable memory include memory devices broadly referred to as memory cards and memory sticks, USB flash drives and jump drives, laser or optical readable memory platforms (e.g., CD, CD-R, CD-RW, DVD, DVD-R, DVD-ROM, DVD-RAM), magnetic memory platforms, and other forms of removable memory.

Generally speaking, one or more filter tables pertaining to one or more movie titles or other multimedia may be uploaded to player memory from either a removable memory loaded into the tray or a removable memory loaded into the RSM reader or otherwise in communication with the RSM reader. In one example, a filter table for a particular movie title is stored from the removable memory in local memory of the player, such as flash memory, random access memory of various types, etc., for ready access during presentation of the multimedia. It is also possible to access a filter table or other form of filter information directly from the removable memory media during presentation. In one example, since the tray is used to load a DVD containing the movie, a separate removable memory medium, including one or more filter tables, loaded into the tray must be removed before play of the movie, unless the filter table is included with the DVD containing the movie. In contrast, removable memory connected with the RSM reader may be accessed at any time, regardless of the presence or absence of a DVD in the tray and regardless of whether a movie is being played.

Figure 2:
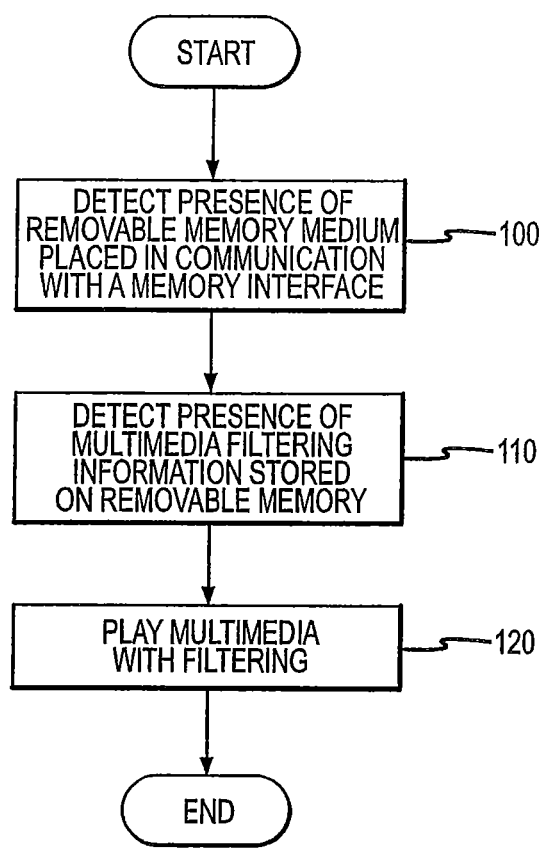
FIG. 2 is a flowchart illustrating one method for loading filter information to a local memory of a media player or otherwise employing filter information from an alternative storage media.

FIG. 2 is a flowchart illustrating one method for the media player 10 to obtain one or more filter tables or other filtering data or files from a removable memory media. First, the media player detects the presence of a removable memory media placed in communication with the RSM reader (operation 100). Next, the media player (e.g., the CPU or other processor or processing arrangement in the media player) determines whether the removable memory has a filter table or other form of filtering information stored thereon (operation 110). Upon detection of filter information, the media player facilitates filtered play of a presentation (operation 120).

Table 3 illustrates various actions taken by a particular DVD player implementation of a media player 10 to upload a filter table or other filter from alternative storage sources, or to take other actions based upon the status of the DVD drive 12, the RSM reader 18, the presence or absence of filter data, and actions of the user. Each line (A-J) in Table 3 represents various possible scenarios of combinations of the DVD drive status, the RSM reader status, the internal DVD player flash memory status, and a user action. Depending on the combination various actions may be taken by the player. The examples set forth with respect to Table 3 refer to a DVD drive and a RSM reader in the form of a universal serial bus port; however, these examples merely refer to one particular implementation and may or may not be employed in other configurations. Moreover, these or other functions may be employed in other media players. In one particular example, filter tables are collectively stored in a computer file with a ".CPF" or other unique extension or file type identifier. The media player is configured to scan the removable memory for the presence of any data file with an extension associated with filter information.

Depending on any particular implementation, it may be necessary to delete existing files in local memory or otherwise ensure there is sufficient local memory space for loading at least one filter table in order for filtered play. The '902 application referenced above, describes implementations for determining and obtaining sufficient local memory space, some or all of which, directly or with slight modification, may be employed in various media player implementations.

TABLE 3

Figure 3:
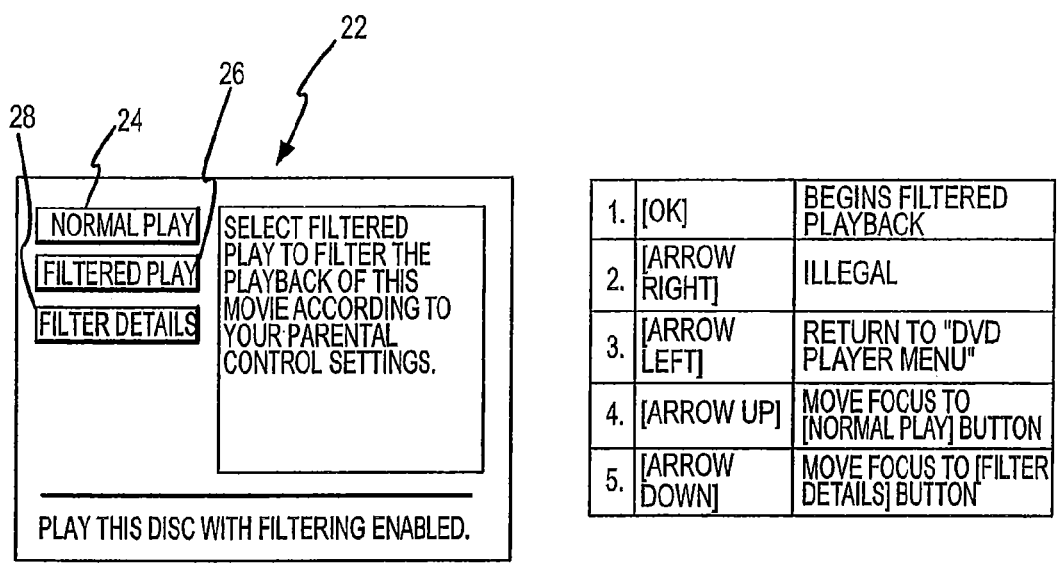
FIG. 3 is a first menu related to playing a media presentation, e.g., a movie, with filtering applied.
Figure 5A:
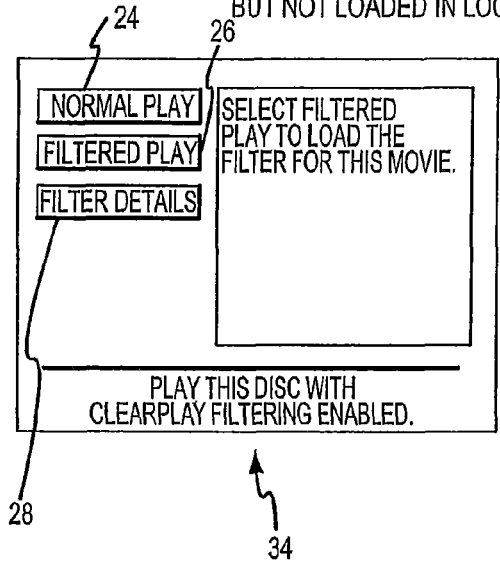
FIG. 5A is a second menu related to loading filter information to a local memory of a media player or otherwise employing filter information from an alternative storage media.
Figure 6:
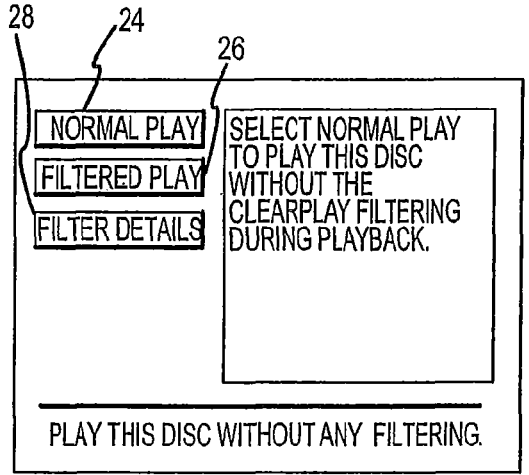
FIG. 6 is a fourth menu related to playing a media presentation, e.g., a movie, without filtering.
Figure 7:
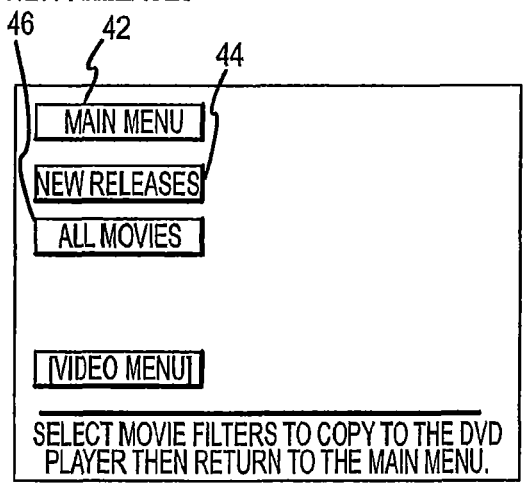
FIG. 7 is a fifth menu related to identifying and loading filter information to a local memory of a media player or otherwise employing filter information from an alternative storage media.

| | DVD Drive Status | RSM Reader Status | Player Flash Status | User Action | Result |
|---|---|---|---|---|---|
| A | Empty | n/a | Matching filter stored in player for DVD X | User inserts DVD X in player | Go to FIG. 3 |
| B | Empty | n/a | Matching filter on master index for DVD X but filter not actually stored in player flash | User inserts DVD X in player | Go to FIG. 5A (note item 6) |
| C | Empty | n/a | Matching filter for DVD X not found in master index | User inserts DVD X in player | Go to FIG. 6 |
| D | DVD not in playback mode | Empty | n/a | User inserts USB drive that only contains 1 cpf file and no other files | Go to FIG. 7 |
| E | DVD not in playback mode | Empty | n/a | User inserts USB drive that has several different files | Open directory of supported file types. If the user selects a .cpf file then go to FIG. 7 |
| F | DVD in drive and in playback mode | Empty | n/a | User inserts USB drive | Stop playback and go to scenario D or E |
| G | DVD in drive and in playback mode | USB Docked | n/a | User removes USB drive | No action |
| H | User Interface in USB menu | USB Docked | n/a | User removes USB drive | Go to DVD player Main Menu |
| I | User Interface in any menu except USB menu | USB Docked | n/a | User removes USB drive | No action |
| J | n/a | information being accessed from USB | n/a | User removes USB drive | Return to previous menu/state before USB was inserted |

Now, with reference to Table 3, row A illustrates the action taken by the media player 10 when the DVD drive 12 is empty, and the user inserts a DVD into the DVD drive. The DVD player checks the title of the movie stored on the DVD 16 and determines that a matching filter table exists in player memory. The status of the USB drive 18 in this scenario is irrelevant. Upon detection of a matching movie filter, the DVD player causes display of the menu screen 22 shown in FIG. 3. Through a remote control or the interface components supported on the front face of the player, the user may select "Normal Play" 24, "Filtered Play" 26, and "Filter Details" 28 menu buttons. Selecting Normal Play, will cause the movie to be played without any filtering. Selecting Filtered Play will facilitate playback of the movie with filtering applied. The '924 application describes various operations and details involved with facilitating filtered play. Note, tables are set forth adjacent the various menus described herein. The tables illustrate actions taken depending on receipt of various control commands.

Figure 4:
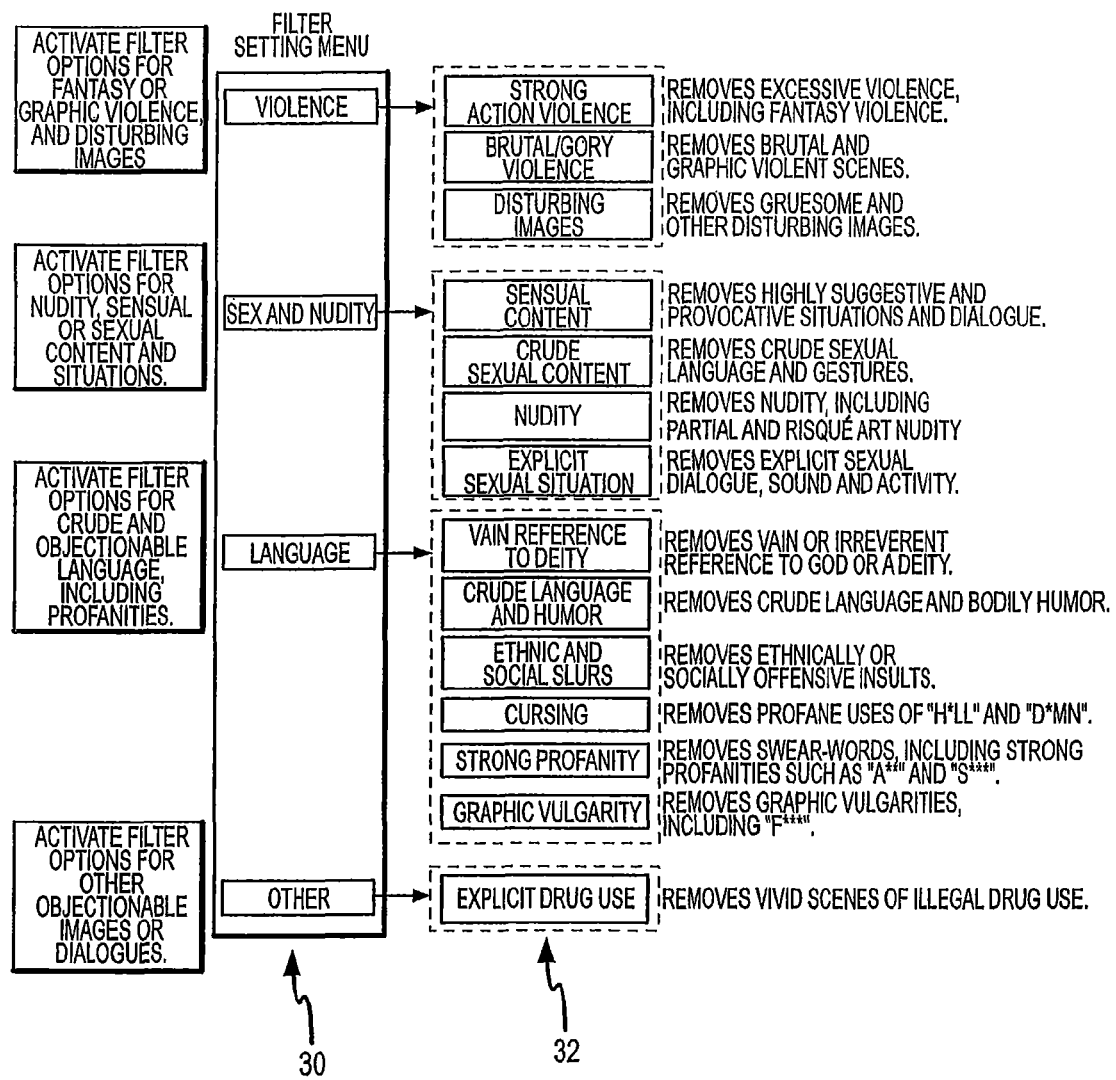
FIG. 4 is a diagram illustrating various classifications of filters and filter types.

FIG. 4 is a block diagram illustrating various possible filter classifications 30, like shown in Table 1 (e.g., violence, sex and nudity, language, and other) along with individual filter types 32 within each class (strong action violence, brutal/gory violence, and disturbing violence in the violence setting). Generally speaking, for any movie title in which a filter table has been developed and it is accessible by the media player, e.g., stored in local memory or in a removable memory, the user may activate any particular individual filter type or types (e.g., strong action violence and brutal/gory violence) and any portions of the movie associated with the filter type will be filtered, e.g., muted, skipped, cropped, or faded, during play.

Through the Filter Details button 28, the user may view all filters available in flash memory or all filters in a master index of all filters available for uploading, but not necessarily already present in flash memory of the DVD player. Generally, the master index provides a list of films for which media content filters (filter tables) are currently available. A current master index may be loaded to player memory whenever the player loads new filtering information or otherwise establishes communication with a removable memory with filter information. In an embodiment conforming to aspects of media player set forth in the '902 application, it also possible to update the master index pursuant to network connectivity. In addition, a list of movies for which a filter will never be generated is also supplied. Many movies and similar presentations do not realistically contain any objectively objectionable content. For example, many G-rated (General Audience)

children's movies do not contain any sexual, violent or profane material that warrant being skipped or muted by a media content filter. If no filter will even be produced for the disc in question, then a display menu may be provided indicating that no filter is available. The menu will also likely allow the user to select the Normal Play option to play the disc without a filter.

If the disc content is the potential target of a filter, the media player checks the master index to determine if such a filter is available for loading. If the master index indicates that the filter is not available, the player then determines whether the master index has been updated recently from the filter provider. Updating of the master index may be considered recent if it has occurred, for example, within the last twelve hours. In other embodiments, an update may be considered recent only if it has occurred within the last few minutes or hours, or within the last few days or weeks. If the information in the master index is considered up-to-date, the media player may present a display menu to indicate that a filter is not available, and to allow the user to play the DVD without content filtering.

If the master index indicates that a filter associated with the loaded disc is available, or if the master index has not been updated recently, the DVD player may be configured to determine whether there is sufficient available memory for an additional filter table. If there is insufficient memory, then the user may be prompted through an on-screen menu arrangement to select movie titles for which associated filter tables will be deleted from memory to allow for storage of new filter tables.

Referring again to Table 3, row B illustrates the action taken by the media player 10 when the DVD drive 12 is empty, and the user inserts a DVD 16 in the DVD drive, but a matching filter table file is not stored in the flash memory of the DVD, but is listed in the master index. Upon detection of this scenario, the DVD player causes display of the menu 34 shown in FIG. 5A. Here, the user has the option of playing the movie back without filtering by selecting Normal Play, or the user may upload the filter data for the movie title by selecting a Filtered Play button. The status of the RSM drive 18, upon insertion of the DVD, is irrelevant. If Filtered Play is selected and the user inserts a removable memory 20 into the RSM drive, the DVD player detects the presence of the memory and checks to determine whether the memory has filter data (e.g., one or more ".CPF" files) containing a filter table for the movie title present in the DVD. If so, the DVD player uploads the filter data to local memory of the DVD player and produces a series of menus prompting the user to activate various filter types.

Figure 5B:
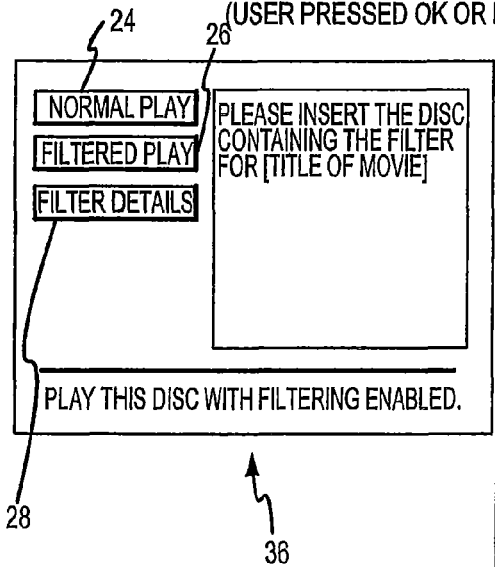
FIG. 5B is a third menu related to loading filter information to a local memory of a media player or otherwise employing filter information from an alternative storage media.

If a removable memory is not in the RSM drive when the Filtered Play button is selected, the menu screen 36 of FIG. 5B is shown, and the user is prompted, through an onscreen message, to load filter data for the movie on the DVD. The user may load a DVD 16 with the filter data into the DVD reader 12 or the user may load a removable memory 20 containing the filter data into the RSM reader 18. In either scenario, the player will search the inserted memory medium for the appropriate filter data and upload it to local memory. As mentioned above, the player may also communicate with the filter data on the memory media rather than upload it to local memory. If the appropriate movie filter data is not present, the user will be prompted with an onscreen message.

Referring again to Table 3, row C illustrates the action taken by the media player when the DVD drive is empty, the user inserts a DVD into the DVD drive, and a matching filter file is not present in local memory or listed in the master index. In this scenario, the media player 10 displays the menu screen 38 of FIG. 6. The menu 38 highlights the Normal Play button 24, which if selected facilitates normal, i.e., unfiltered, playback of the movie. If the user scrolls down to the Filtered Play button 26 and selects it, the user is prompted to load a memory (e.g., DVD or USB memory) containing the appropriate filter data as discussed above with regard to FIGS. 5A and 5B. It is possible that filter data (e.g., a filter table) has been developed for the movie title, but is not present in the master index of the DVD player. Each time new filter data is uploaded to local memory, the master index is updated with a complete listing of all filter tables available at that time. Thus, if it has been some time since the filter data was uploaded to local memory, the master index may not reflect all available movie filters.

Row D illustrates the action taken by the media player 10 when a DVD 16 is inserted in the DVD drive 12, but playback has not begun, and the RSM reader 18 is empty. In this scenario, a user inserts a memory 20 into the RSM reader. The memory has a file containing filter data, such as a .CPF file, but contains no other files/folders, data, etc. The file may have a filter table for one particular movie title, or media filter tables for many different movie titles. Upon insertion of the memory into the drive, the media player displays the menu screen 40 of FIG. 7. The screen has three selection options, "Main Menu" 42, "New Releases" 44, and "All Movies" 46. Selection of the Main Menu button 44 returns the user to a main menu. Selection of the New Releases button displays all movie titles for recently developed filter tables on the memory and the All Movies button selects all movie titles with a filter table in the memory. To upload filters to internal player memory, the user selects either the New Releases or All Movies button, and is presented with a screen that lists movie filters associated with the button. One example of such a filter table listing selection menu 48 is shown in FIG. 8. By scrolling up or down the movie title list 50, the user may select any of the movie filters listed and upload the filters to flash memory of the DVD player, subject to memory availability. At a minimum, the user selects the particular filter for the movie they would like to play. Scrolling up or down the list highlights individual movie filters for which the screen also includes other details concerning the highlighted movie filter, such as the number of DVD releases for the movie, a description of the highlighted release, the aspect ratio of the release, the language of the movie, the date the filter was created, and the catalog number.

Still referring to Table 3, row E illustrates the action taken by the media player when a DVD is inserted in the DVD drive, but playback has not begun, and the RSM reader is empty. In this scenario, a user inserts a memory 20 into the RSM reader 18, but instead of one file with filter data, the memory has more than one file, which may be two or more filter files or other file types (e.g., .JPG, .DOC, etc.). The DVD player searches the list of files to determine whether any files containing filter data are present. In one example, all files with filter data have a .CPF extension, and all such files are displayed for the user. After the user selects a .CPF file, control is passed to the screen 48 of FIG. 8 for the user to select particular movie filters to upload to flash memory.

Row F illustrates the action taken by the media player 10 when a DVD is playing, and the RSM reader 18 is empty. In this scenario, a user inserts a memory 20 into the RSM reader causing playback to stop. Then, depending on whether one CPF file is present or multiple files are present, control is passed to either the screen of FIG. 7 or the operations associated with Row E occur, respectively.

Row G illustrates the action taken by the media player when a DVD is playing, and the RSM reader has a memory installed and the memory is removed during playback. In this scenario, no action is taken, i.e., the movie continues to play.

Row H illustrates the action taken by the media player when a memory is inserted in the RSM reader and the user is working with a screen for selecting movie title filters, e.g., the screen of FIG. 7 or 8. If the memory is removed, the video player exits the filter screen and displays the DVD player main menu screen.

Row I illustrates the action taken by the media player 10 when a memory 20 is in the RSM reader 18, but the user is working in some screen, besides a filter selection screen, and the user removes the memory. In such a scenario, the media player maintains the state the player is in, and takes no action based upon the removal of the memory.

Finally, Row J illustrates the action taken by the media player when information is being accessed from a memory in the RSM reader and the memory is removed during the accessing. In such a scenario, the media player returns to the state immediately proceeding the action of downloading. For example, if the user was acting in the screen of FIG. 8 to select various filters for uploading, and had initiated uploading, control is returned to the screen of FIG. 8. The user may be prompted with a message indicating that uploading was interrupted by removal of the memory.

Disclosed herein are various aspects of a media player and related method for loading media content filters to a media player by way of a removable memory media. While the disclosed embodiments are described in specific terms, other embodiments encompassing principles of the invention are also possible. Also, while specific examples of menus presented to the user have been provided, many other ways of presenting the same or related information may be employed to the same end. Further, while specific examples particularly discuss a DVD player, other types of media players capable of displaying movies and other media presentations, may also be utilized within the scope of the invention.

Throughout the application, reference is made to integrated local filter storage memory of the media player. While such memory is ordinarily thought of as memory permanently installed on a printed circuit board of the player, the removable storage media may also be used to store the filters employed by the player. For example, memory sticks, USB sticks, removable flash memory, and the like, connectable to the RSM reader of the player accessible by the user, may be employed to similar end. As a result, the removable storage medium may be coupled with a home computer of the user. The user may then download the filters over the Internet from the filter provider, storing those filters into the removable storage medium. The medium could then be removed from the home computer, and connected to the media player by way of the RSM interface of the player designed for the medium, such as a USB port. The player could then access the filters for use in filtering the content of the DVDs associated with those filters. It is also possible to obtain the removable memory media containing filter information by other means, such as mail order, from a movie outlet, or on the same memory as the media.

Further, operations and menus are presented in one particular order. The order, however, is but one example of the way that operations and menus may be provided. Operations and menus may be rearranged, modified, or eliminated in any particular implementation while still conforming to aspects of the invention.

The present invention extends to methods, systems, and computer program products for automatically identifying and filtering portions of multimedia content during the decoding process. A media player conforming to aspects of the present invention may include a special purpose or general purpose computer including various computer hardware, a television system, an audio system, and/or combinations of the foregoing. In all cases, the described embodiments should be viewed a exemplary of the present invention rather than as limiting it's scope.

Embodiments within the scope of the present invention also include computer readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

We claim:

1. A method for loading filter information to a media player comprising:

analyzing a status of a memory reader of the media player adapted to communicate with a first storage memory including data associated with a multimedia presentation;

establishing communication between the memory reader and a second storage memory;

determining whether the second storage memory includes filtering information associated with a multimedia presentation wherein the filter information comprises at least one identification of a start time and end time associated with a portion of the multimedia presentation along with a filtering action; and providing for presentation of the multimedia presentation pursuant to the filtering information.

2. The method of claim 1 wherein the first storage memory is a removable storage medium and the second storage memory is a removable memory adapted for communication with a flash memory reader.

3. The method of claim 2 wherein the flash memory reader is selected from at least the group comprising a universal serial bus port, a multimedia card reader, an SD card reader, and a compact flash card reader.

4. The method of claim 1 wherein the multimedia presentation comprises a movie.

5. The method of claim 4 wherein the multimedia presentation comprises a movie stored on an optical storage memory.

6. The method of claim 1 wherein the multimedia presentation comprises encoded video and audio data.

7. The method of claim 6 wherein the multimedia presentation comprises motion pictures expert group encoded video and audio data.

8. The method of claim 1 wherein the first storage memory and the second storage memory are not the same storage medium.

9. A method for loading filter information to a media player comprising:
analyzing a status of a memory reader of the media player adapted to communicate with a first storage memory including data associated with a multimedia presentation;
establishing communication between the memory reader and a second storage memory;
determining whether the second storage memory includes filtering information associated with a multimedia presentation wherein the filter information comprises at least one identification of a start location and an end location associated with a portion of the multimedia presentation along with a filtering action; and
providing for presentation of the multimedia presentation pursuant to the filtering information.

10. The method of claim 9 wherein the filtering action is selected from the group comprising skipping, muting, blurring, and cropping.

11. The method of claim 9 further comprising at least one content identifier.

12. The method of claim 11 wherein the at least one content identifier is selected from the group comprising violence, sex and nudity, language, and other.

13. The method of claim 1 further comprising loading the filtering information from the second storage memory into a local memory.

14. The method of claim 13 further comprising providing for selectively loading the filtering information from the second storage memory into the local memory.

15. The method of claim 13 further comprising determining whether there is sufficient space in the local memory.

16. The method of claim 1 wherein the operation of providing for presentation of the multimedia presentation pursuant to the filtering information further comprises reading the filtering information from the second storage memory.

17. A tangible non-transitory computer readable media comprising computer readable instructions for performing the method of claim 1.

18. The method of claim 9 wherein the first storage memory and the second storage memory are not the same storage memory.

19. A media player comprising:
a processing configuration in communication with a first memory reader of the media player configured to receive and read information from a first storage memory including data associated with a multimedia presentation;
the processing configuration in communication with at least one second memory reader of the media player configured to read filter information from a second storage memory; and
the processing configuration operable to:
determine whether the filtering information is associated with the multimedia presentation wherein the filter information comprises at least one identification of a start location and an end location associated with a portion of the multimedia presentation along with a filtering action; and
present the multimedia presentation pursuant to the filtering information.

20. The media player of claim 19 wherein the second memory reader is selected from at least the group comprising a universal serial bus port, a multimedia card reader, an SD card reader, and compact flash card reader.

21. The media player of claim 19 wherein the first storage memory and the second storage memory are not the same storage memory.

22. A method comprising:
analyzing a status of a memory reader adapted to communicate with a first storage memory including data associated with a multimedia presentation;
establishing communication between the memory reader and a second storage memory;
determining whether the second storage memory includes filtering information associated with a multimedia presentation wherein the filter information comprises at least one identification of a start time and end time associated with a portion of the movie multimedia presentation that is not played; and
providing for presentation of the multimedia presentation pursuant to the filtering information.

23. The method of claim 22 wherein the multimedia presentation comprises encoded video and audio data.

24. The method of claim 23 wherein the multimedia presentation comprises motion pictures expert group encoded video and audio data.

25. The method of claim 22 wherein the first storage memory and the second storage memory are not the same storage memory.

* * * * *